(12) United States Patent
Yoshida

(10) Patent No.: US 6,864,665 B2
(45) Date of Patent: Mar. 8, 2005

(54) BATTERY STATE MONITORING DEVICE AND ELECTRONIC DEVICE FITTED WITH SUCH DEVICE

(75) Inventor: Shinichi Yoshida, Kawasaki (JP)

(73) Assignee: Eastman Kodak Company, Rochester, NY (US)

(*) Notice: Subject to any disclaimer, the term of this patent is extended or adjusted under 35 U.S.C. 154(b) by 59 days.

(21) Appl. No.: 10/600,219

(22) Filed: Jun. 20, 2003

(65) Prior Publication Data
US 2004/0257088 A1 Dec. 23, 2004

(51) Int. Cl.[7] .............................................. H01M 10/46
(52) U.S. Cl. ..................................... 320/132; 345/102
(58) Field of Search ................................ 320/132, 149; 345/63, 102, 211, 212, 214

(56) References Cited

U.S. PATENT DOCUMENTS 5,386,577 A * 1/1995 Zenda ........................ 713/340
5,493,685 A * 2/1996 Zenda ........................ 713/340
5,854,617 A * 12/1998 Lee et al. .................... 345/102

* cited by examiner

Primary Examiner—Edward H. Tso
(74) Attorney, Agent, or Firm—Pamela R. Crocker

(57) ABSTRACT

In an electronic device that uses a self-emissive display such as an organic EL display, terminal voltage of a battery is monitored with high precision.

In a digital camera 10, an organic EL display 26 is driven by a battery 12. The terminal voltage of the battery 12 is detected and a CPU 20 compares the detected terminal voltage with a threshold voltage to determine whether or not a fully discharged state has been reached. The luminance level of an image for the next frame stored in a VRAM 24 is detected, and the threshold value is dynamically changed according to the luminance level.

14 Claims, 4 Drawing Sheets

| BLOCK A | BLOCK B | BLOCK C | LUMINANCE LEVEL | CONSUMED CURRENT | THRESHOLD VALUE |
|---|---|---|---|---|---|
| ON | ON | ON | L1 | i a | Vtha |
| ON | ON | OFF | L2 | i b | Vthb |
| ON | OFF | OFF | L3 | i c | Vthc |

Fig. 3

BATTERY STATE MONITORING DEVICE AND ELECTRONIC DEVICE FITTED WITH SUCH DEVICE

FIELD OF THE INVENTION

The present invention relates to a battery state monitoring device, and to an electronic device provided with such a monitoring device, and particularly to a device for monitoring terminal voltage of a battery for driving a self-emissive display.

BACKGROUND OF THE INVENTION

Generally, with a portable device driven by a battery, final discharge of a battery or battery state up to final discharge is to be detected and indicated, and to do so the battery voltage is detected, converted to digital information by an A/D converter or the like, and periodically monitored. However, by simply detecting the battery terminal voltage a value detected by the A/D converter is lower than the apparent actual terminal voltage due to the occurrence of a voltage drop due to internal resistance of the battery, contact resistance, or resistance of wiring inside the device, that is, a voltage drop to an extent of current consumed by the load. Therefore, in the case of comparing detected terminal voltage with a threshold voltage to determine whether or not the battery has reached a fully discharged state, if the load current is large, in a situation where it should originally have been determined that the battery terminal voltage was still sufficient and that the battery had not reached the fully discharged state, since the apparent terminal voltage is lower, it becomes lower than the threshold voltage and the fully discharged state is erroneously judged.

In the related art, threshold voltage is adjusted using the following methods.
(1) Already-known conditions where consumed electrical current (consumed power) is almost constant are created, and battery terminal voltage in this load state is detected and judgment is performed. With this method, since the load conditions are always the same, it was no longer necessary to correct the threshold voltage. See, for example, Japanese Patent laid-open Publication No. Hei 09-281542.
(2) A small resistance was placed in the power supply line, and a potential difference (that is, consumed current) across both ends of the resistance was detected, and threshold voltage corrected based on this consumed current. With this method, since the consumed current of the battery itself is detected, high precision threshold voltage correction is possible. See, for example, Japanese Patent laid-open Publication No. 2001-021941.
In order to ascertain device load conditions, an ON/OFF state of each functional block of a device is managed by a processor, the consumed current (consumed power) at the time of operation of each functional block measured in advance is stored as a table in a memory, and then the consumed current (consumed power) of functional blocks that are in operation at the time of detecting the battery voltage is totaled up, and threshold voltage is corrected using this total value.

Since whether or not the battery has reached the fully discharged state is judged through comparison of detected terminal voltage and a threshold voltage, this is technically equivalent not to correction of threshold voltage, but also to correction of detected terminal voltage.

However, with the above described method (1), occasions arise where conditions in which the consumed current during operation of other functional blocks within the device is not nearly constant, and in this case there is a problem that monitoring of the battery can not be carried out.

Also, with the above described method (2), since a small resistance is inserted in the power supply line and the consumed current detected directly, a need arises to add new devices such as operational amplifiers, and with components having large current consumption there is a new problem that loss is generated in the resistance inserted into the power supply line.

On the other hand, with the above described method (3), these types of problems do not arise, but problems occur depending on the type of display device of the device. That is, in the case of using a liquid crystal display as a display of the device, transmission/shielding is controlled to display shading of an image and so the power consumption is almost constant, but in the case of using a self-emissive display such as an organic EL display, power consumption varies greatly depending on the luminance of the image. Therefore, in a portable device having a self-emissive display, in the case of monitoring the state of a battery using method (3) described above, there is a problem in that it is not possible to correctly monitor battery state using a display image displayed on the self-emissive display. Specifically, in the case of setting a threshold voltage each time a functional block is turned on or off assuming that power consumption of the self-emissive display is a particular fixed value, if the image displayed on the self-emissive display is bright, the apparent terminal voltage is detected as being low, and therefore the threshold voltage become relatively higher than the original threshold voltage. Conversely, if the image displayed on the self-emissive display is dark, the threshold voltage becomes lower than the original threshold voltage, and both of these cases invite erroneous judgment.

SUMMARY OF THE INVENTION

The advantage of the present invention is that it provides a device that can monitor terminal voltage of a battery for supplying power to a display for displaying an image with high precision.

The present invention provides a battery state monitoring device for monitoring terminal voltage of a battery for supplying electrical power to display means for displaying an image, comprising voltage detection means for detecting terminal voltage of the battery, comparison means for comparing the detected terminal voltage and a threshold voltage, detection means for detecting luminance level of the image displayed in the display means, and adjustment means for adjusting the threshold voltage or the detected terminal voltage according to the luminance level, wherein the battery terminal voltage is monitored using comparison by the comparison means. Because the apparent battery terminal voltage varies depending on the luminance level at the display means, the threshold voltage or detected terminal voltage is varied depending on the luminance level making it possible to monitor battery state with high precision regardless of the luminance level. In the case where consumed current (power consumption) at the display means is increased depending on luminance level, adjustment is carried out to lower the threshold voltage or increase the detected terminal voltage by the extent of increase in luminance level, which corrects for the drop in the apparent terminal voltage.

It is also possible for the present invention to comprise storage means for storing a relationship between the luminance level and discharge current of the battery, and for the adjustment means to perform adjustment using the relationship stored in the storage means.

The present invention also provides a battery state monitoring device, for monitoring terminal voltage of a battery for supplying electrical power to a self-emissive display for displaying an image, comprising voltage detection means for detecting terminal voltage of the battery, first arithmetic means for detecting operation or non-operation of each functional block inside a device driven by the battery to calculate a first consumed electrical current when the battery drives each functional block, second arithmetic means for calculating a second consumed electrical current when the self-emissive display is driven by detecting an average luminance level of an image displayed by the self-emissive display, third arithmetic means for calculating a threshold voltage in order to monitor terminal voltage of the battery based on the first consumed electrical current and the second consumed electrical current, or correcting detected terminal voltage, and fourth arithmetic means for comparing detected terminal voltage and the threshold voltage and outputting a result.

BRIEF DESCRIPTION OF THE DRAWINGS

FIG. 3 is a drawing for describing the relationship between operation/non-operation of a functional block and luminance level and threshold voltage;

DESCRIPTION OF PREFERRED EMBODIMENT

An embodiment of the present invention will be described below based on the drawings.

Figure 1:
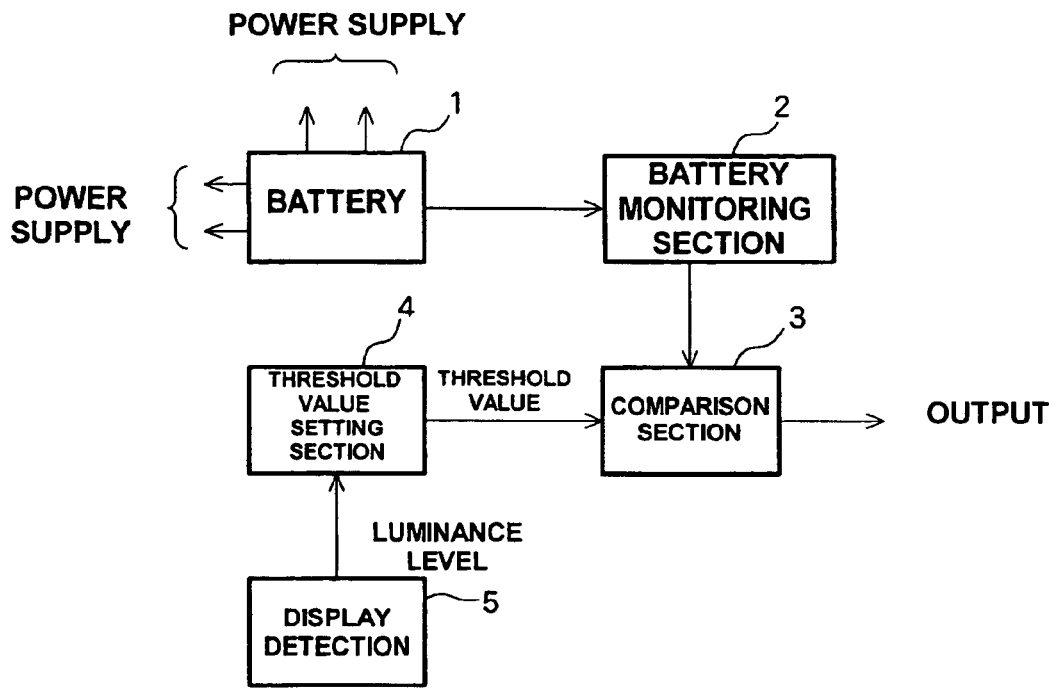
FIG. 1 is a conceptual structural diagram of an embodiment of the present invention.

FIG. 1 conceptually shows the structure of this embodiment. The electronic device of this embodiment comprises a battery 1, battery monitoring section 2, comparison section 3, threshold value setting section 4 and display section 5. The display section 5 is a self-emissive display device for generating light by converting applied electrical energy to light energy.

The battery 1 supplies power to each section of the device, and also to the display section 5.

The battery monitoring section 2 detects terminal voltage of the battery 1 and supplies the detected terminal voltage to the comparison section 3.

The comparison section 3 compares the detected terminal voltage from the battery monitoring section 2 with a threshold value from the threshold value setting section 4 and outputs the comparison result as the state of the battery 1. That is, if the detected terminal voltage exceeds the threshold value, it is determined that there is still remaining capacity, and if the detected terminal voltage is equal to or lower than the threshold value, it is determined that a fully discharged state has been reached.

The threshold value setting section 4 sets the threshold value depending on the operating state of each functional block within the device, and the luminance level of an image displayed on the display section 5, and supplies the set threshold value to the comparison section 3. As the threshold value it is possible to set a value representing that the remaining capacity of the battery 1 is low, as well as a threshold value for determining the above described fully discharged state.

It is also possible for the terminal voltage of the battery 1 to be detected by the battery monitoring section 2, to input the threshold value set in the threshold value setting section 4 and compare the detected terminal voltage and the threshold value in the battery monitoring section 2. That is, it is not necessary for the battery monitoring section 2 and the comparison section 3 to be provided separately.

Also, the comparison section 3 compares the voltage of the battery 1 detected by the battery monitoring section 2 with the threshold value, but it is also possible for the threshold value setting section 4 to set a threshold value depending on the on/off state of functional blocks of each section of the device unrelated to the luminance level, to supply this threshold value to the comparison section 3 and for the comparison section 3 to correct the detected voltage from the battery monitoring section 2 according to the luminance level of the display section 5, and compare the corrected detected voltage with the threshold value and output the comparison result. It is preferable to adjust one of either the detected terminal voltage or the threshold value depending on the luminance level and to compare the two.

Figure 2:
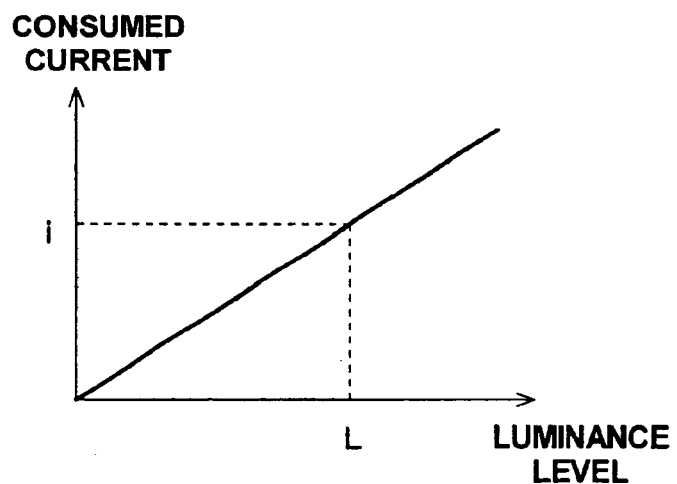
FIG. 2 is a graph showing a relationship between luminance level of a displayed image and consumed current of the battery.

FIG. 2 shows a relationship between luminance level of an image displayed on the display section 5 and consumed current of the battery 1. Consumed current increases substantially in proportion to increase in the luminance level. For example, in the case of the display section 5 being an organic EL display, luminescence of organic EL display pixels is proportional to injected carrier density, that is, injected current, and overall luminance level of the display section 5 made up of an array of a plurality of pixels with luminescence strength of a pixel defined as P(i, j) becomes Σ P(i,j), which means that the luminance level and the consumed current have a substantially proportional relationship. Accordingly, the threshold value setting section 4 sets the threshold value lower as the luminance level increases (so as to be a smaller value), or performs adjustment so that the detected terminal voltage is made higher (a larger value) as the luminance level increases, and compares the two. When the image displayed on the display section 5 varies with time, the correction amount of the threshold voltage or the detected terminal voltage is also varied dynamically together with changes in the image. In this way, by adjusting either the threshold value of the detected terminal voltage according to the luminance level it is made possible to monitor the state of the battery 1 with high precision taking into account the luminance level of an image displayed on the display section 5.

FIG. 3 shows a threshold value setting method, for the threshold value setting section 4, that takes into consideration the operating state of each functional block within the device, and the consumed current dependent upon luminance level of the display section 5. In the drawing, block A, block B and block C are provided as functional blocks within the device. The consumed current of each functional block during operation is measured in advance and stored as a table either inside the threshold value setting section 4 or in an external storage section. Also, as shown in FIG. 2, since the relationship between luminance level of the display section 5 and consumed current is determined on a one-to-one basis, the consumed current of the display section 5 is also univocally determined. Accordingly, the total consumed current of the battery 1 is presented as the sum of the current of each functional block and the current of the display section 5, and the threshold value is set based on this total consumed current. For example, if all of block A, block B or block C are operating, and the luminance level of the display section 5 is L1, the total consumed current becomes ia, and the threshold value is set to Vtha using this total current. If block A and block B are both operating while bock C is not operating, and the luminance level of the display section 5 is L2, total consumed current is ib, and the threshold value is set to Vthb using this total current. Similarly, if block A and block B are both not operating while bock C is operating, and the luminance level of the display section 5 is L3, total consumed current is ic, and the threshold value is set to Vthc.

The table can be divided up into a first table specifying consumed current according to operation/non-operation of the functional blocks, a second table specifying consumed current according to luminance level, and a third table specifying threshold voltage according to total consumed current. Namely, consumed current corresponding to operation/non-operation of the functional blocks is read out using the first table, then consumed current depending on the luminance level is read out using the second table, and a sum of the two is calculated. The threshold voltage is then read out from sum consumed current using table 3.

A battery state monitoring device of this embodiment will be specifically described in the following.

Figure 4:
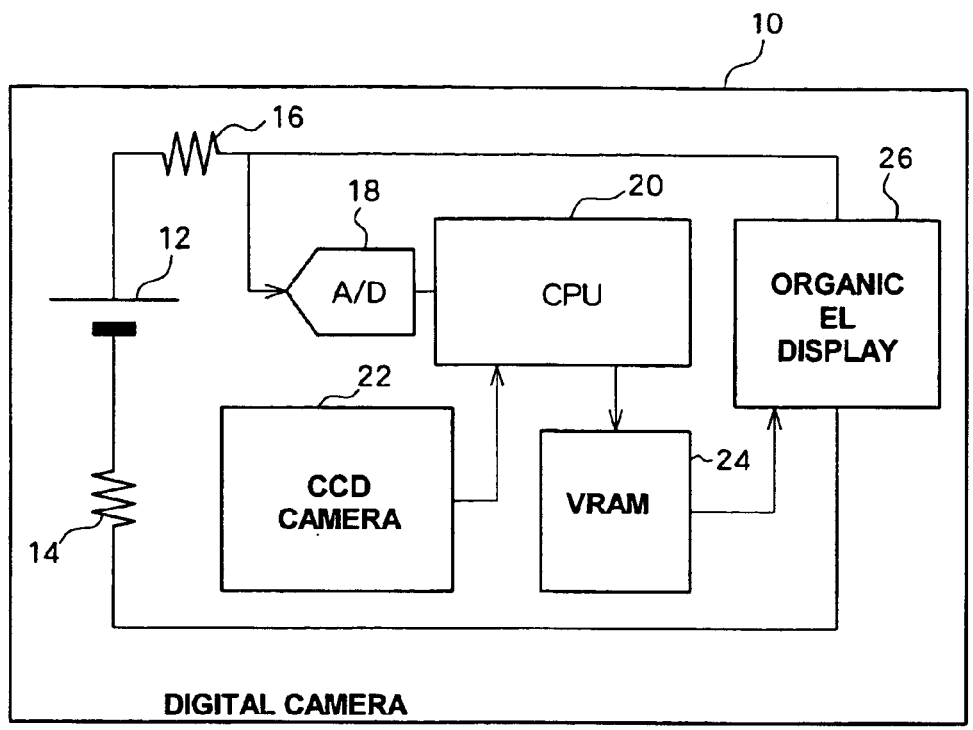
FIG. 4 is a structural drawing of a digital camera including a battery state monitoring device in accordance with the present invention.

FIG. 4 shows the structure of a digital camera 10, as exemplary of an electronic device containing the battery state monitoring device of this embodiment. The digital camera 10 comprises a battery 12, internal resistance 14 of the battery 12, power supply line resistance 16, an A/D converter 18, a CPU 20, CCD camera 22, video RAM (VRAM) 24 and an organic EL display 26.

The battery 12 supplies necessary power to each section of the digital camera 10. The battery 12 also supplies power to the organic EL display 26.

The A/D converter 18 detects terminal voltage of the battery 12, converts the detected value to a digital value, and supplies this digital value to the CPU 20.

The CPU 20 converts an image obtained by the CCD camera 22 to a specified format, for example, JPEG format, and stores it in the VRAM 24. In the case of JPEG format, the CPU 20 carries out compression by respectively subjecting a luminance signal Y and chrominance signals Cr and Cb constituting an image signal acquired by the CCD camera 22 to DCT processing, quantization and entropy encoding, and stores the result in the VRAM 24. The CPU 20 then reads out the image data stored in the VRAM 24 for display on the organic EL display 26.

With this type of arrangement, the CPU 20 compares the detected terminal voltage input from the A/D converter 18 with a threshold voltage Vth for determining full discharge, and if the detected terminal voltage > the threshold voltage Vth, it is determined that the fully discharged state has not been reached, while if the detected terminal voltage ≦ the threshold voltage Vth, it is determined that the fully discharged state has been reached, and the determined state is displayed on the organic EL display 26. Besides using the threshold voltage Vth to determine the fully discharged state, the CPU 20 can also set a threshold value (WEAK threshold voltage) for determining that the amount of remaining capacity is low, and compare this threshold voltage with the detected terminal voltage and display the result on the organic EL display 26. The way displaying of determination results is handled is arbitrary, and it is possible, for example, to display using an indicator system or to display an alarm message. The CPU 20 detects luminance level of an image displayed on the organic EL display 26 from image data stored in the VRAM 24, and sets the threshold voltage Vth based on this luminance level. Specifically, a table specifying a relationship between overall consumed current, depending on the ON/OFF state of each functional block of the digital camera 10 and a luminance level, and threshold voltage Vth, is stored in advance in the memory of the CPU 20, and a corresponding threshold voltage Vth is read out based on the ON/OFF state of each functional block of the digital camera 10 and the luminance level detected from the image data stored in the VRAM 24, and compared with the detected terminal voltage. The table can be divided up into a table specifying a relationship between ON/OFF state of the functional blocks, a table specifying a relationship between luminance level and consumed current, and a table specifying a relationship between luminance level and adjustment amount for a base threshold voltage. In the latter case, the CPU 20 first of all reads out a base threshold voltage from the functional block operating state, then adjusts the base threshold value according to the detected luminance level to set a final threshold voltage Vth.

Figure 5:
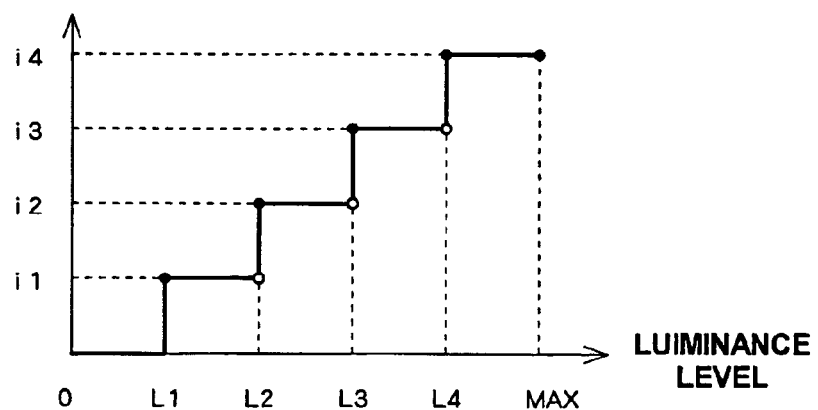
FIG. 5 is a graph showing a relationship between luminance level stored in the digital camera of FIG. 4 and consumed current.

FIG. 5 shows a relationship between the luminance level stored in the memory of the CPU 20 and consumed current. A luminance level from 0 to the maximum value MAX is divided into 5 stages, 0–L1, L1–L2. L2–L3, L3–L4 and L4–MAX, with a consumed current value assigned to each stage to specify the relationship between luminance level and consumed current. Specifically, luminance level 0–L1: consumed current=0
luminance level L1 –L2: consumed current=i1
luminance level L2–L3: consumed current=i2
luminance level L3–L4: consumed current=i3
luminance level L4–L5: consumed current=i4

A person skilled in the art would understand that it is possible to specify the relationship between luminance level and consumed current in finer steps. The luminance level is detected from the image data stored in the VRAM 24, but specifically the luminance level of the organic EL display 26 according to the level of a luminance signal Y stored in the organic EL display 26 is detected. That is, levels P(i,j) of a pixel luminance signal Y are added up for all pixels and a luminance level for all pixels is detected. Of course, it is also possible to detect not only the luminance signal Y but also Cr and Cr level, to sum all levels for R pixels, G pixels and B pixels as a luminance level. Also, when detecting the luminance level it is possible to calculate average luminance for all pixels of the organic EL display and to determine consumed current according to the average luminance level. It is also possible to use a luminance level for all pixels or an average luminance level after thinning out by, for example ¼, or instead of all of the pixels.

Figure 6:
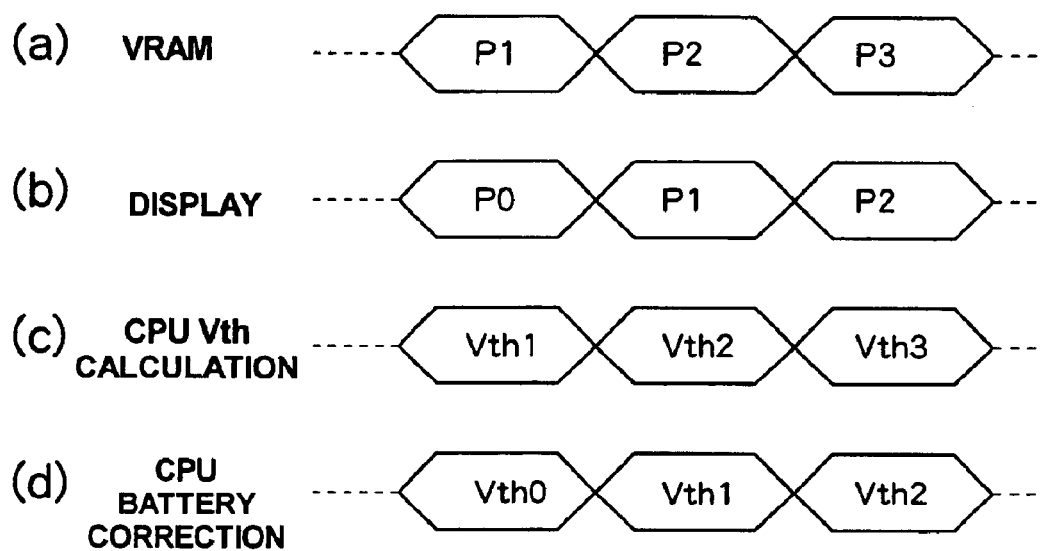
FIG. 6 is a timing chart for adjustment of a threshold voltage in accordance with the present invention.

FIG. 6 shows timing for adjustment of threshold voltage Vth by the CPU 20. FIG. 6(*a*) shows timing for storing image data in the VRAM 24, FIG. 6(*b*) shows timing for display on the organic EL display 26, FIG. 6(*c*) shows timing for calculation of threshold voltage Vth by the CPU 20, and FIG. 6(*d*) shows timing for monitoring of the battery 12 by the CPU 20.

As shown in FIG. 6(*a*), sequential image data P1, P2, P3 is stored in the VRAM 24. Since image data stored in the VRAM 24 is read out and displayed on the organic EL display 26, when P1 is newly stored in the VRAM 24 the image data P0 stored previously is read out from the VRAM 24 and displayed. After image data P1 has been stored in the VRAM 24, this image data is read out at the next switching timing and displayed on the organic EL display 26, and at this time the CPU 20 writes image data P2 to the VRAM 24. After image data P1 has been written to the VRAM 24, the CPU 20 calculates luminance level using this image data P1 and sets the threshold voltage Vth1 using image data P1. The set threshold voltage Vth1 is not that used for image data P0 currently being displayed on the organic EL display 26, but is used at the next switching timing, that is, at the time of displaying image data P1 on the organic EL display 26, and terminal voltage of the battery 12 is monitored.

Similarly, the next image data P2 is stored in the VRAM 24 while image data P1 is being displayed on the organic EL display 26, and the CPU 20 uses image data P2 to calculate luminance level and then sets the threshold voltage Vth2 for image data P2. The threshold voltage is switched from Vth1 to Vth2 at the time of switching image data of the organic EL display 26 from P1 to P2, and while P2 is being displayed, the detected terminal voltage and the threshold value Vth2 are compared in size. In this way, with this embodiment threshold voltage is newly set each time an image is displayed on the organic EL display.

According to this embodiment, the threshold voltage can be adaptively adjusted no matter what type of image is displayed on the organic EL display 26, to monitor the terminal voltage of the battery 12. As a result, it is possible to reliably determine whether or not the battery 12 has reached a fully discharged state, and accordingly it is possible for the CPU 20 to prevent the situation where operation suddenly becomes impossible due to the terminal voltage of the battery 12 being insufficient when a bright image is displayed before that situation actually arises.

It is also possible to set an intermediate threshold voltage by linear interpolation of threshold voltage for preceding and subsequent images, instead of switching the threshold voltage for every display image (every frame).

With the example described above, the threshold voltage Vth is adjusted for every display image according to overall luminance level or average luminance level of the organic EL display 26, but it is also possible to adjust the detected terminal voltage for every display image. That is, luminance level of image data stored in the VRAM 24 is detected to determine a detected terminal voltage correction value, and the detected terminal voltage is corrected for every display image. As tables, it is possible to have a consumed current table for each ON/OFF state of a functional block, a consumed current table for each luminance level, and a table defining detected terminal voltage correction values for each total consumed current. In FIG. 3, it is also possible to use a table having detected terminal voltage correction values in place of the threshold values.

In the event that the detected terminal voltage is Vdet, it is corrected to Vdet+$\Delta$V1 when image P1 is displayed, corrected to Vdet+$\Delta$V2 when image P2 is displayed, and compared with the threshold voltage. Here, $\Delta$V1 and $\Delta$V2 are correction values depending on luminance level.

An embodiment of the present invention has been described above, but the present invention is not thus limited and various modifications are possible.

For example, in the embodiment, a description has been given using a digital camera as an example, but it is also possible to apply the present invention to an electronic device that is portable and has a self-emissive display device, and example of such electronic devices besides digital cameras are PDA's (personal digital assistants) and portable telephones.

Further, as the organic EL display, it is also possible to use an LED display or a plasma display as a self-emissive display.

As has been described above, according to the present invention it is possible to monitor terminal voltage of a battery with high precision.

Part List 1. battery
2. battery monitoring section
3. comparison section
4. threshold value setting section
5. display detection
10. digital camera
12. battery
14. internal resistance
16. power supply line resistance
18. A/D converter
20. CPU
22. CCD camera
24. video RAM (VRAM)
26. organic EL display
(b) display
(c) CPU Vth calculation
(d) CPU battery correction

What is claimed is:

1. A battery state monitoring device for monitoring terminal voltage of a battery for supplying electrical power to display means for displaying an image, comprising:
    voltage detection means for detecting terminal voltage of the battery;
    comparison means for comparing the detected terminal voltage and a threshold voltage;
    detection means for detecting luminance level of the image displayed in the display means; and
    adjustment means for adjusting the threshold voltage or the detected terminal voltage according to the luminance level, wherein
    the battery terminal voltage is monitored using comparison by the comparison means.

2. The battery state monitoring device of claim 1, further comprising storage means for storing a relationship between the luminance level and discharge current of the battery, and wherein the adjustment means performs adjustment using the relationship stored in the storage means.

3. The battery state monitoring device of claim 1, wherein the adjustment means performs adjustment according to average luminance level of the image displayed on the display means.

4. The battery state monitoring device of claim 1, wherein the adjustment means performs adjustment according to the luminance level in the event that the image displayed on the display means is made up of luminance data and chrominance data.

5. The battery state monitoring device of claim 1, wherein, in the event that the image displayed on the display means is made of R pixel data, G pixel data and B pixel data, the adjustment means performs adjustment according to the overall luminance data of the R pixel data, G pixel data and B pixel data.

6. The battery state monitoring device of claim 1, wherein the adjustment means performs adjustment according to an average luminance level of a thinned-out image obtained by thinning out the image displayed by the display means to only a specified number of pixels.

7. The battery state monitoring device of claim 1, wherein the display means generates light itself using electrical power from the battery.

8. The battery state monitoring device of claim 7, wherein the display means is an organic EL display.

9. A battery state monitoring device, for monitoring terminal voltage of a battery for supplying electrical power to a self-emissive display for displaying an image, comprising:

voltage detection means for detecting terminal voltage of the battery;

first arithmetic means for detecting operation or non-operation of each functional block inside a device driven by the battery to calculate a first consumed electrical current when the battery drives each functional block;

second arithmetic means for calculating a second consumed electrical current when the self-emissive display is driven by detecting an average luminance level of an image displayed by the self-emissive display;

third arithmetic means for calculating a threshold voltage in order to monitor terminal voltage of the battery based on the first consumed electrical current and the second consumed electrical current, or correcting detected terminal voltage; and fourth arithmetic means for comparing detected terminal voltage and the threshold voltage and outputting a result.

10. The battery state monitoring device of claim 9, further comprising image data storage means for storing image data of an image displayed on the self-emissive display, and wherein the second arithmetic means detects the average luminance level using the image data stored in the image data storage means.

11. An electronic device including the battery state monitoring device of claim 1 and further including image capture means for acquiring the image.

12. A device of claim 11, wherein the electronic device is a digital camera, a PDA or a portable telephone.

13. An electronic device including the battery state monitoring device of claim 9 and further including image capture means for acquiring the image.

14. A device of claim 13, wherein the electronic device is a digital camera, a PDA or a portable telephone.

* * * * *